United States Patent [19]

White

[11] 3,826,993

[45] July 30, 1974

[54] METHOD FOR RAPIDLY EXCITING AND SUSTAINING OSCILLATIONS IN A RESONANT SYSTEM

[75] Inventor: Roby Byron White, Cumberland, R.I.

[73] Assignee: Brafton Corporation, Medfield, Mass.

[22] Filed: Sept. 18, 1970

[21] Appl. No.: 73,461

[52] U.S. Cl. .......................... 331/1, 23/313, 55/15, 55/277, 318/130, 331/26, 331/111, 331/154

[51] Int. Cl. ........................ B01d 51/08, H03b 3/04

[58] Field of Search ............ 331/1, 18, 25, 26, 111, 331/116 M, 154, 156; 55/15, 277, DIG. 25; 204/307; 210/19, DIG. 18; 310/15, 17, 19; 318/130; 23/313, 314

[56] References Cited

UNITED STATES PATENTS

| | | | |
|---|---|---|---|
| 3,010,073 | 11/1961 | Melas | 331/1 |
| 3,197,714 | 7/1965 | Prevallet, Jr. | 331/1 |

OTHER PUBLICATIONS

H. W. St. Clair, "Agglomeration of Smoke, Fog or Dust Particles by Sonic Waves," Industrial and Engineering Chemistry, Vol. 41, No. 11, November 1949, pp. 2434–2438.

*Primary Examiner*—Herman Karl Saalbach
*Assistant Examiner*—Siegfried H. Grimm

[57] ABSTRACT

Method and apparatus for initiating and sustaining oscillations in a system having a free oscillatory period, comprising an oscillating means (preferably including a relaxation oscillator of the resistor-capacitor type) connected to apply a periodic driving force to the system, the oscillating means having an intrinsic period approximately equal to the period of the system, a detector connected to sense operation of the oscillating means and the oscillations, if any, of the system and to detect a phase difference therebetween, and circuitry with an input connected to the detector, the circuitry connected to the oscillating means to be effective to modify the oscillations of the oscillating means so as to maintain the phase difference within predetermined limits.

4 Claims, 6 Drawing Figures

FIG 3
| POLARITY ON TERMINAL 61 | POLARITY ON TERMINALS 63 & 65 | OFF DIODES | POLARITY ON TERMINAL 88 |
|---|---|---|---|
| + | + | 66a , 66c | + |
| + | − | 66b , 66d | − |
| − | + | 68a , 68c | − |
| − | − | 68b , 68d | + |
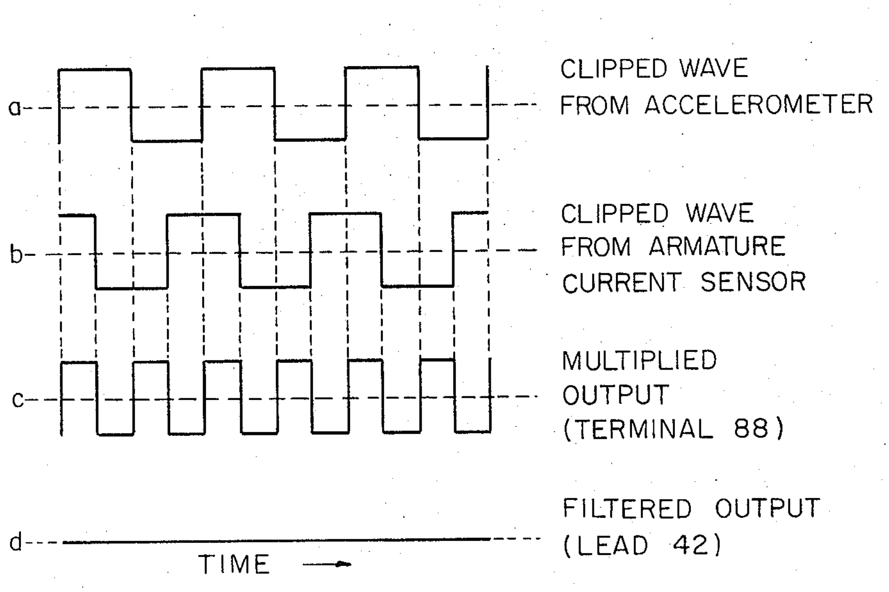
FIG 4
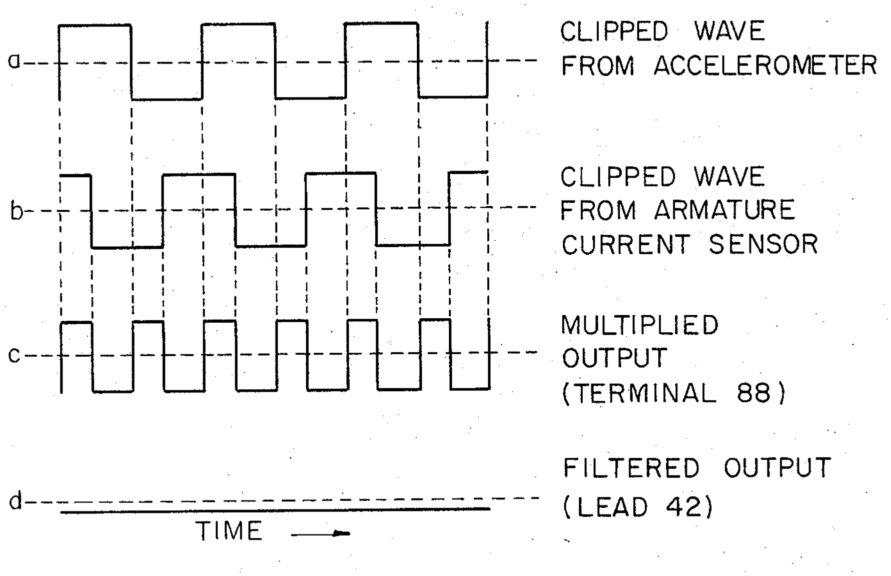
FIG 5

METHOD FOR RAPIDLY EXCITING AND SUSTAINING OSCILLATIONS IN A RESONANT SYSTEM

This invention relates to frequency control generally and in particular to starting and driving an oscillating system.

The invention is of general utility in applications in which it is desired to drive an oscillating system by means of a self-sustaining driving oscillator and where it is desired that the characteristics of the system, once it has begun to oscillate, exert some degree of control over the oscillations of the driving oscillator. It is especially adapted for starting and supplying power to a high-Q system such as a mass-spring vibrator used as a stimulator in a sonic agglomeration device.

Objects of the present invention are to build up rapidly from a quiescent state and to sustain the oscillations of a system.

Another object of the invention is to provide a driver for use with oscillatory structures with a high-Q (that is, a high ratio of energy stored to energy dissipated in each cycle of oscillation) which it is desired to oscillate at their resonant frequency.

A further object of the invention is to provide such a system which automatically detects and corrects drift of an oscillator from a desired frequency, such as the resonant frequency of an oscillatory structure.

The invention features method and apparatus for initiating and sustaining oscillations in a system having a free oscillatory period, comprising an oscillating means (preferably including a relaxation oscillator of the resistor-capacitor type) connected to apply a periodic driving force to the system, the the oscillating means having an intrinsic period approximately equal to the period of the system, a detector connected to sense operation of the oscillating means and the oscillations, if any, of the system and to detect a phase difference therebetween, and circuitry with an input connected to the detector, the circuitry being connected to the oscillating means to modify the oscillations of the oscillating means so as to maintain the phase difference at a preferred value.

In a preferred embodiment, a driving system, e.g., for a sonic stimulator, comprises a structure defining self-sustaining oscillating means arranged to oscillate initially at a predetermined frequency, driving means responsive to the oscillation of the oscillating means to produce forces at a frequency indicative of the predetermined frequency, vibratory structure having a resonant frequency and being arranged to be oscillated at a frequency which is substantially equal to the resonant frequency by these forces, a detector arranged to sense the actual phase relationship of the oscillations of the driving means to the oscillations of the vibratory structure having a preferred phase relationship when the structure oscillates at its resonant frequency, and feedback means responsive to the detector to vary the frequency of oscillation of the oscillating means in a direction to bring the actual phase relationship into near correspondence with the preferred phase relationship, the oscillator being free-running when the vibratory structure is stationary and coming under the control of the feedback means when the vibratory structure oscillates.

Other objects, features and advantages will become apparent from the following description of a preferred embodiment of the invention, taken together with the attached drawings thereof, in which:

FIG. 3 is a diagram showing the polarity of certain voltages and the condition of control diodes in the apparatus during operation;

FIG. 4 is a plot of various control voltages illustrating the phase relationships in the apparatus of FIG. 2 when in ideal adjustment;

FIG. 5 is a plot of corresponding voltages when the phase relationships are slightly out of adjustment; and, FIG. 6 is a schematic view of a portion of a sonic agglomerator with a system driven according to the invention.

Figure 1:
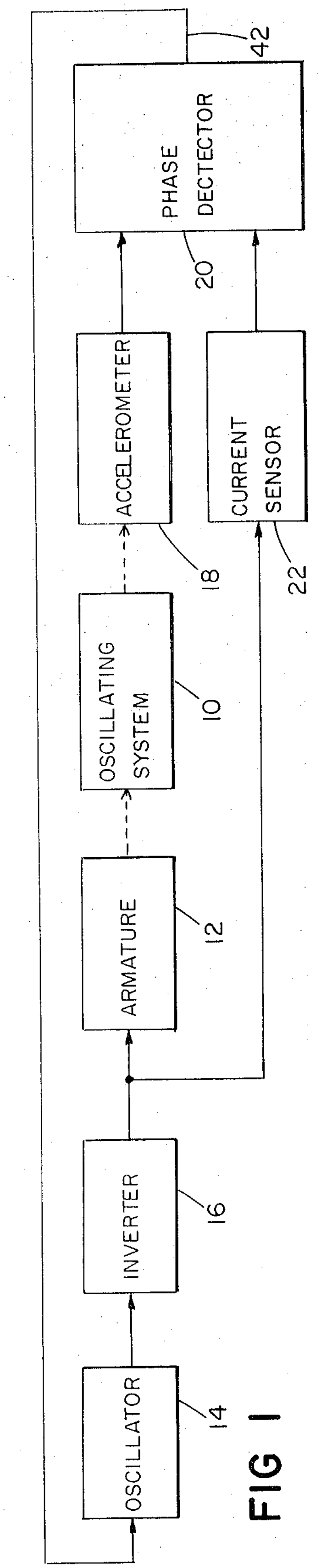
FIG. 1 is a block diagram of an oscillating system driven by an oscillator in accordance with the invention.
Figure 6:
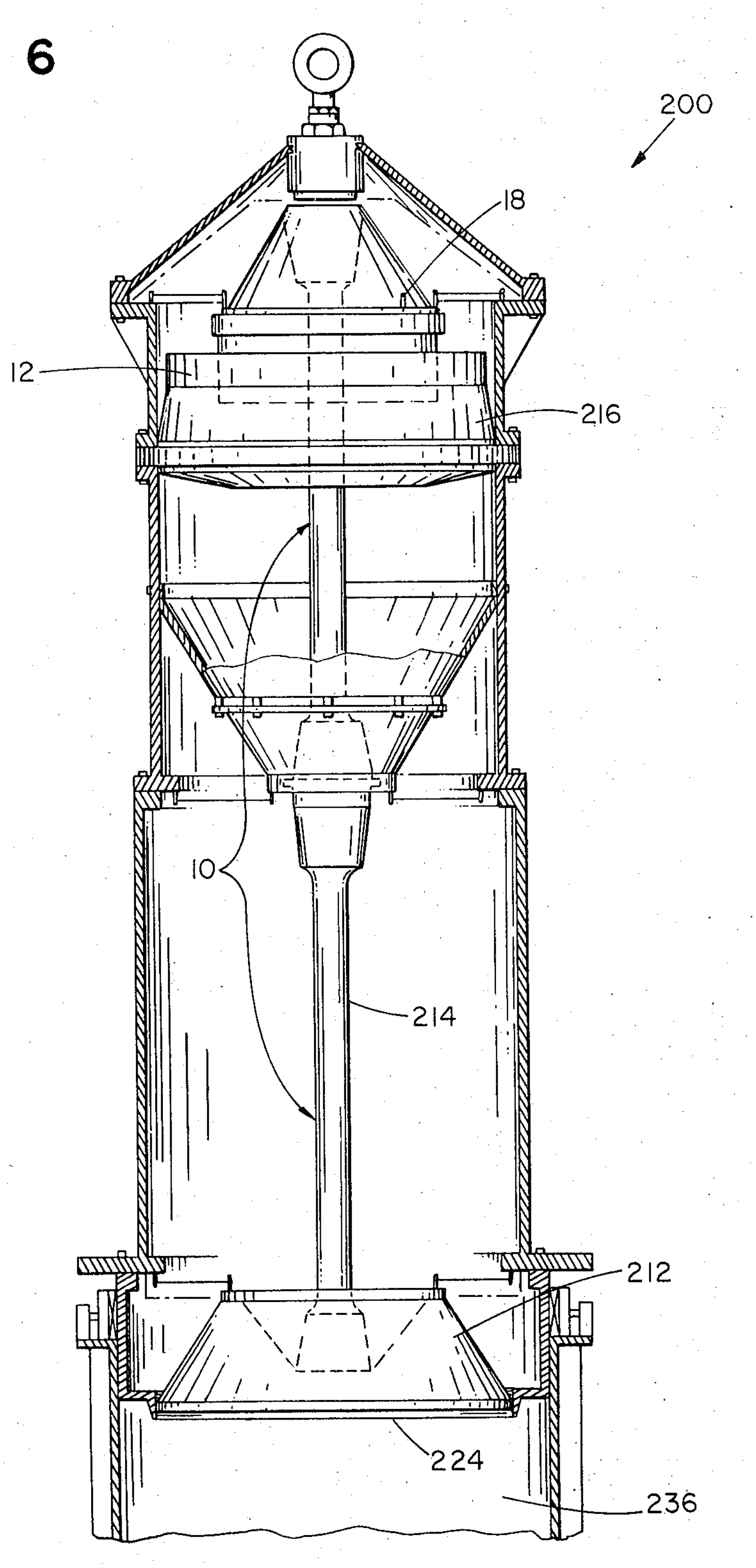

FIG. 1 shows apparatus for oscillating an oscillatory system 10 having a high-Q and, therefore, an extremely peaked response curve near its resonant frequency. The system, for example, may be a stimulator for a sonic agglomeration device 200 such as that shown in FIG. 6, and fully described in the assignee's copending application Ser. No. 854,373, entitled STIMULATOR, filed Sept. 2, 1969, in the name of Caperton B. Horsley. The oscillating system 10 consists of armature mass 12 and equal piston mass 212 connected by steel tube 214. System 10 oscillates at a frequency of about 400 Hz in a mode wherein masses 12 and 212 move in opposed directions, alternatively compressing and extending tube 214. The system is supported at a vibrational node so that the energy escaping from the system through its supports is minimized, and the energy dissipated in the system is small since tube 214 is highly elastic, so that the Q of the system is consequently extremely high.

The system is driven by reciprocating forces induced by alternating currents in armature mass 12 located in the field of D.C. magnet 216. The motions of extended surface 224 of piston mass 212 causes a high intensity sound field to be produced in resonant chamber 236, which is particularly useful for agglomerating particles, such as for removing solid pollutants or scrubbing pollutant chemicals from industrial discharge gases or smoke.

Referring again to FIG. 1, the apparatus includes a self-sustaining relaxation oscillator 14, which generates a periodic control voltage which is fed to power inverter 16. Power inverter 16 produces an A.C. output current which is fed to armature 12. Armature 12 produces periodic forces which drive oscillating system 10. Accelerometer 18 senses the motion of system 10 and generates a corresponding voltage which is fed to an input of phase detector 20. Current sensor 22 senses the current fed to armature 12 and generates a corresponding voltage which is fed to a second input of phase detector 20. Phase detector 20 generates a voltage related to the difference in phase between its first input (from accelerometer 18) and its second input (from current sensor 22) which is fed to oscillator 14 where it is used to modify the frequency of the oscillator.

Figure 2:
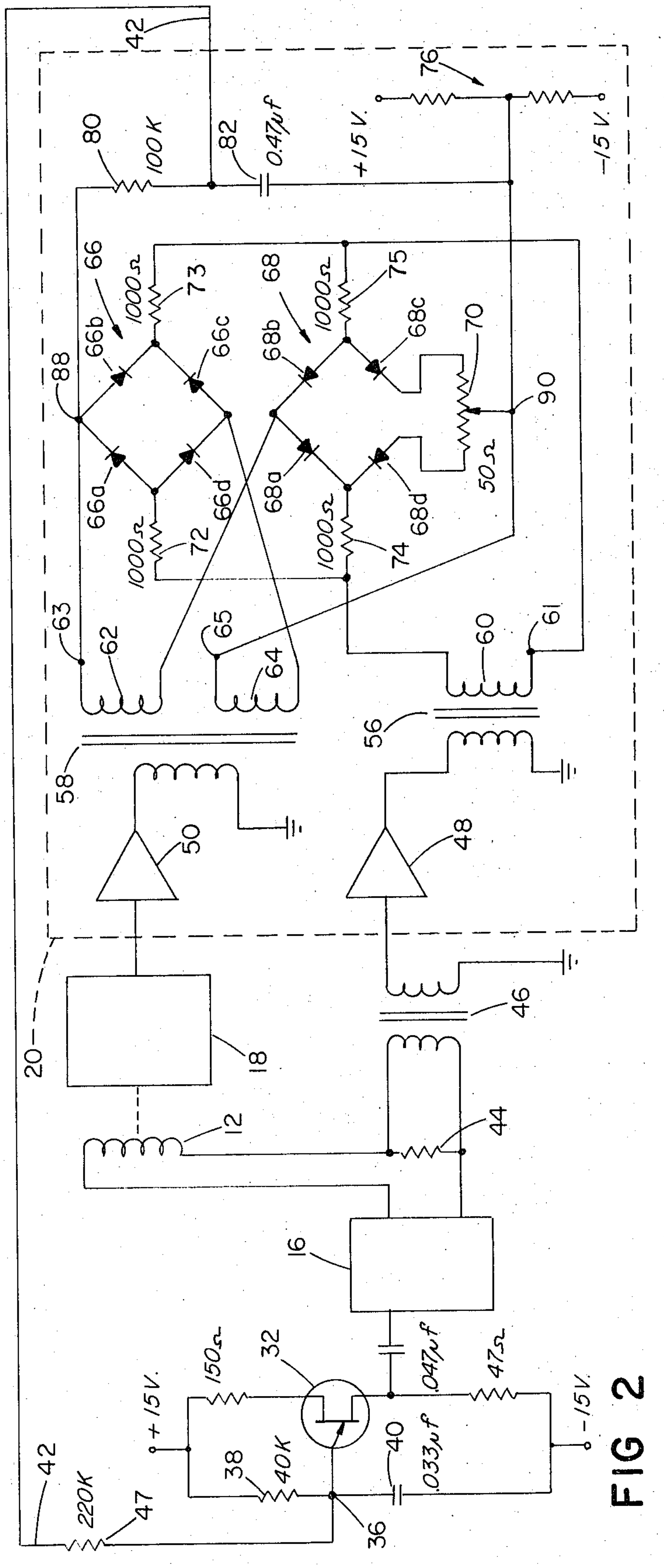
FIG. 2 is an electrical schematic wiring diagram corresponding to block diagram of FIG. 1.

Referring now to FIG. 2 which shows the electrical wiring of the apparatus in detail, relaxation oscillator 14 includes a unijunction transistor 32 having its base contacts connected through current limiting resistors to +15v. D.C. and −15 v. D.C. sources and its emitter connected to terminal 36 which is connected to the +15v. source through 40,000 ohm resistor 38 and to the −15v. source through 0.033 microfarad capacitor 40. Lead 42 is also connected to terminal 36 through gain resistor 47.

The inverter 16 connected to the output of oscillator 14 employs conventional circuitry well known to those skilled in the art to generate a sinusoidal power current at the frequency of its input. The MacMurray inverter described in Chapter 7 of Bedford and Hoft: Principles of Inverter Circuits (John Wiley & Sons, 1964) may, for example, be used.

The output of inverter 16 is fed to armature 12 in stimulator 200 (FIG. 6) through shunt resistor 44. Transformer 46 has its input connected across resistor 44 and its output connected to input amplifier 48 (preferably a National LM-101 type) of phase detector 20.

Accelerometer 18 is attached to armature mass 12 of oscillating system 10 so that its output voltage is proportional to the acceleration of armature 12. The output of accelerometer 18 is connected to input amplifier 50, identical with amplifier 48.

The output of amplifier 48 is connected to the primary winding of isolating transformer 56 which has a secondary winding 60 with 1.5 turns ratio. The output of amplifier 50 is connected to the primary of transformer 58 with two secondary windings 62, 64 each with a turn ratio of 1.0. Amplifiers 48 and 50 have input impedances in excess of 5,000 ohms at the operating frequency. Phase detector 20 includes rectifier bridge 66 with diodes 66*a*, 66*b*, 66*c*, and 66*d* connected in a loop and rectifier bridge 68 with diodes 68*a*, 68*b*, 68*c*, and 68*d* connected in a loop including balancing potentiometer 70. Winding 60 is connected as shown in FIG. 2 through resistors 72, 73, 74 and 75 across bridges 66 and 68. Winding 62 is connected to bridge 66 and the center tap of potentiometer 70 of bridge 68. Winding 64 is connected to bridges 66 and 68 as shown. Potentiometer 70 is adjusted to compensate for differences in operating characteristics between the diodes of bridges 66 and 68. The tap of potentiometer 70 is tied into voltage divider 76 set to the firing voltage of transistor 32. The output from the bridge circuits is taken from terminal 88 at the junction of diodes 66*a* and 66*b* and terminal 90 at the tap of potentiometer 70 and after filtering by resistor 80 and capacitor 82 is connected to lead 42 connecting back to the input of oscillator 14.

To explain the operation of the apparatus it is convenient to consider first the operation of phase detector 20. Sinusoidal inputs to amplifiers 48 and 50 are amplified to saturation and clipped to produce square topped wave forms which are transmitted through transformers 56 and 58 essentially unchanged. When the voltage induced on winding 60 is positive on terminal 61 all diodes of bridge 68 are made conductive. If, further, the induced voltages on windings 62 and 64 are positive on terminals 63 and 65 respectively, diodes 66*a* and 66*c* are off, and current from coil 62 circulates through diode 66*b*, and resistors 73 and 75 while current from coil 64 circulates through diode 66*d* and resistors 72 and 74, with the result that the voltage applied to terminal 88 (relative to terminal 90) is positive. If, however, the induced voltages on windings 62 and 64 are negative on terminals 63 and 65 (the voltage on terminal 61 of winding 60 still being positive) diodes 66*b* and 66*d* are off, and current from winding 62 circulates throgh diode 66*a* and resistors 74 and 72 while current from coil 64 circulates through diode 66*c* and resistors 75 and 73 with the result that the voltage applied to terminal 88 is negative. When the voltage induced on terminal 61 of coil 60 is negative, all diodes of bridge 66 are made conductive, and a similar analysis applies with exchange of bridges. The results, summarized in FIG. 3, show that the bridge circuits operate as a sign multiplier, applying a voltage to terminal 88 (relative to terminal 90) with a sign equal to the product of the signs of the input voltages fed to the inputs of amplifiers 48 and 50. The filter, consisting of resistor 80 and capacitor 82, smooths the resulting wave form so that the voltage output is averaged.

Suppose now that voltages exactly 90° out of phase are fed to amplifiers 48 and 50 from the current sensor 22 and the accelerometer, respectively. The clipped voltages at the outputs of amplifiers 48 and 50 (and also at the secondary windings of transformers 56 and 58) will be as shown in the lines *a* and *b* of FIG. 4, (where all lines are plotted to a common time scale). The voltage on terminal 88 (with respect to terminal 90) is then, as shown in line *c* of FIG. 4, a square wave changing sign when either the armature current input (line *b* ) or the accelerometer input (line *a*) changes sign. In particular, with the supposed phase difference of 90° between the inputs, the duration of positive and negative portions of the wave found on terminal 88 would be equal and filtered output would be nil, as shown in FIG. 4, line *d*. The corresponding wave forms are shown in FIG. 5 under the supposition that the input from the current sensor leads the input from the accelerometer by slightly more than 90°. In this case the positive portion of the wave form on terminal 88 is of less duration than the negative portion and the output from the filter on lead 42 is negative. It can be readily seen that the magnitude of the output increases as the input phase difference increases from 90° and that if the input from the current sensor were to lead that from the accelerometer by less than 90° the sign of the filtered output would be positive. The operation of the phase detector is thus to generate an output voltage on lead 42 which is a measure of the deviation of the inputs to amplifiers 48 and 50 from a condition of 90° phase difference.

Turning now to the operation of the apparatus as a whole, consider the situation immediately after the apparatus has been turned on. The relaxation oscillator 14 will immediately begin oscillating at its full design amplitude, and, responsive to the action of oscillator 14, inverter 16 will supply current at full design level to armature 12. Oscillating system 10, however, initially has only a very small amplitude of oscillation. The output from accelerometer 18 is accordingly initially insufficient to provide an effective input signal to amplifier 50. Phase detector 20 has therefore no output initially, and oscillator 14 oscillates at a frequency determined by resistor 38 and capacitor 40, which are chosen to give an oscillating frequency near 400 Hz. Since the frequency of oscillation of oscillator 14 is approximately equal to the resonant frequency of oscillating system 10, oscillator 14 continues for a time to drive inverter 16 in proper phase relationship to build up oscillations in oscillating system 10. As soon, however, as the oscillations in system 10 are sufficient to produce an effective output from accelerometer 18, phase detector 20 begins to produce an output which exercises control over oscillator 14. In particular, if the armature current leads the accelerometer output by more than 90° a negative voltage is generated by the phase detector which draws current through lead 42 from terminal 36 of the oscillator and slows the charging of capacitor 40. The discharge of transistor 32 is thereby delayed, tending to reduce the frequency of the oscillator and maintain the phase difference between armature current and accelerometer close to 90°. In an analogous fashion if the armature current leads the accelerometer by less than 90°, the phase detector generates a positive voltage which supplies current to capacitor 40 tending to increase the oscillator's frequency. The control circuitry thus permits the driving oscillator to oscillate initially at full amplitude to drive the oscillating system at a frequency determined by the circuit constants of the oscillator, but as soon as the oscillating system achieves an appreciable amplitude of oscillation the control circuitry locks the oscillator into a definite phase relationship with the oscillating system.

In the preferred embodiment described above, the preferred phase relationship is a 90° difference between the accelerometer output and the armature current, and the phase detector is constructed accordingly. It will, however, be readily apparent to those skilled in the art that the invention can be applied with appropriate circuitry to maintain any preferred phase relationship between a driving oscillator and a driven system.

What is claimed is:

1. The method for rapidly exciting from a quiescent state and thereafter sustaining oscillations in a high-Q system having a resonant frequency comprising the steps initially and while oscillations of said system are of amplitude insufficient for effective detection, stimulating said system at a frequency approximately equal to said resonant frequency by forces controlled by a driver, said forces being independent of the amplitude of oscillations of said system, and when oscillations of said system have increased to amplitude sufficient for detection, sensing the phase of said system oscillations, comparing the phase of said system oscillations with the phase of oscillations of said driver to form a signal indicative of phase difference between said system oscillations and said driver oscillations, and applying said signal to control said driver and effect a preferred phase relationship between the oscillations of said driver and the oscillations of said system, and forming a waveform indicative of the phase of but independent of the amplitude of said system oscillations.

2. The method of claim 1 wherein said waveform is a square top wave formed by amplifying and clipping a signal from said system.

3. The method of claim 2 wherein said system is a mass-spring mechanical vibrator.

4. The method of claim 3 including the step of exciting with said vibrator a sonic agglomerator.

* * * * *